(12) United States Patent
Jeyaseelan et al.

(10) Patent No.: US 8,176,341 B2
(45) Date of Patent: May 8, 2012

(54) PLATFORM POWER MANAGEMENT BASED ON LATENCY GUIDANCE

(75) Inventors: Jaya L. Jeyaseelan, Cupertino, CA (US); Neil Songer, Santa Clara, CA (US); Barnes Cooper, Tigard, OR (US); Paul S. Diefenbaugh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 619 days.

(21) Appl. No.: 12/059,992

(22) Filed: Mar. 31, 2008

(65) Prior Publication Data

US 2009/0249103 A1    Oct. 1, 2009

(51) Int. Cl.
  *G06F 27/28* (2006.01)
(52) U.S. Cl. ........ 713/300; 713/310; 713/320; 713/321; 713/322; 713/323; 713/324; 713/330; 713/340
(58) Field of Classification Search .................. 713/300, 713/310, 320–324, 330, 340
  See application file for complete search history.

(56) References Cited

U.S. PATENT DOCUMENTS

| | | | | |
|---|---|---|---|---|
| 5,758,173 A * | 5/1998 | Evoy | ............................ | 713/320 |
| 7,222,252 B2 * | 5/2007 | Dutton et al. | ................ | 713/323 |
| 7,716,506 B1 * | 5/2010 | Surgutchik et al. | ........... | 713/321 |
| 7,984,314 B2 | 7/2011 | Cooper et al. | | |
| 2004/0163003 A1 * | 8/2004 | Dutton et al. | ................ | 713/320 |
| 2007/0042620 A1 * | 2/2007 | Lapstun et al. | .............. | 439/157 |
| 2007/0234088 A1 | 10/2007 | Marshall et al. | | |
| 2009/0172434 A1 | 7/2009 | Kwa et al. | | |
| 2009/0327774 A1 | 12/2009 | Jeyaseelan et al. | | |
| 2010/0169684 A1 | 7/2010 | Jeyaseelan et al. | | |
| 2010/0169685 A1 | 7/2010 | Gough et al. | | |
| 2010/0310299 A1 * | 12/2010 | Lapstun et al. | ............... | 401/195 |
| 2011/0078473 A1 | 3/2011 | Kwa et al. | | |

FOREIGN PATENT DOCUMENTS

| | | |
|---|---|---|
| CN | 1592879 A | 3/2005 |
| JP | 2000-222057 | 11/2000 |
| JP | 2001-142588 | 5/2001 |
| JP | 2001-285543 | 10/2001 |
| JP | 2005018662 | 1/2005 |
| KR | 563691 | 3/2006 |

OTHER PUBLICATIONS

Korean Patent Application No. 2009-0027647, Korean First Office Action issued Dec. 15, 2010, 3 pages.
Japanese Patent Application No. 2009-085357, Japanese First Office Action issued Mar. 16, 2011, 5 pages.
Chinese Patent Application No. 200910149780.5, Chinese First Office Action issued Nov. 18, 2010, 14 pages.
Cooper et al., "Designing Power-Friendly Devices," WinHEC 2007, pp. 1-27, May 8, 2007.
White Paper, Intel Xeon Processor MP Platforms, "Designing Power-Friendly Devices," pp. 1-18, Copyright 2007.

(Continued)

*Primary Examiner* — Abdelmoniem Elamin
(74) *Attorney, Agent, or Firm* — Schwabe, Williamson & Wyatt, P.C.

(57) ABSTRACT

Embodiments of a system for receiving power management guidelines from a first plurality of components of a system, and developing a power management policy to manage one or more of a second plurality of components of the system based at least in part on the received power management guidelines. Other embodiments are described.

22 Claims, 6 Drawing Sheets

OTHER PUBLICATIONS

PCIExpress Base Specification version 2.0, "Latency Tolerance Reporting," pp. 1-6, Feb. 5, 2008.
PCI Express Base Specification version 2.0, "Latency Tolerance Reporting," pp. 1-6, Feb. 8, 2008.
PCI Express Base Specification version 2.0, "Latency Tolerance Reporting," pp. 1-6, Jan. 22, 2008.
PCI Express Base Specification version 2.0, pp. 1-608, Dec. 20, 2006.
PCIe Enhancements for Platform PM Improvement, "Latency Tolerance Reporting," pp. 1-6, Dec. 12, 2007.
PCIe Enhancements for Platform PM Improvement, "Optimized Buffer Flush/Fill," pp. 1-7, Dec. 12, 2007.

* cited by examiner

PLATFORM POWER MANAGEMENT BASED ON LATENCY GUIDANCE

TECHNICAL FIELD

Embodiments of the disclosure relate to the field of power management, and more particularly to methods and apparatuses for managing platform power based on various latency guidelines.

BACKGROUND

In today's technological world, performances of electronics devices are improving at a rapid pace, with a rapid increase in their computing power. With this increase, the devices are becoming power hungry, i.e., consuming more power. To save power, a processor in a device may enter in a sleep mode (e.g., low power state) during brief periods of inactivity.

For example, the Advanced Configuration and Power Interface (ACPI) specification (e.g., version 3.0a released on Dec. 30, 2005) co-developed by Hewlett-Packard®, Intel®, Microsoft®, Phoenix®, and Toshiba® defines various power states (e.g., processor power states C0-C3 during normal G0/S0 working state of the device) in ACPI-compatible systems. According to the ACPI specification, C0 state may be the normal execution state of the processor. However, while in C1 state during brief period of inactivity, the processor may not execute instructions, but can return to an executing state almost instantaneously, whereas in C3 state (which is a deeper sleep state compared to C1, and saves more power than C1), the processor's caches may maintain state but ignore any snoops. The processor may take longer time to return to a normal executing state (C0) from the C3 state as compared to returning from C1 state. Variations on the each of the states, including the C3 state (e.g., deep sleep, deeper sleep, etc.), that may differ in how deep the processor sleeps (i.e., what functionalities of the processor is disabled to save power) and how long it takes to wake up, is also possible.

Conventional power management, including those defined by the ACPI standard, may be performed based on heuristics collected on the processor and guidance given by the operating system, and a power management algorithm may look at past processor activities to predict future activity. For example, the operating system may look at the central processing unit utilization to provide this guidance. Based on these factors, the processor may enter into one of a plurality of sleep states. Although a processor may intermittently enter into a low power state, other platform components with a longer wake-up time may not usually enter into any such low power state to ensure better performance.

FIG. 1 is an exemplary graphical representation of a total power consumption of a platform (line A) of a prior art computing system and the power consumption of its prior art processor (line B) across a workload consisting of periods of activities while running applications followed by inactivity (idle state). Referring to FIG. 1, the processor may scale its power from up to 20 Watts (W) during brief activity periods to almost 1 W when idle. While the processor is idle, the platform may still have a ~9 W idle power floor, of which less than 1 W may be due to the processor. That is, the rest of the platform components in the computing system may not scale down as well as the processor during idle states. The platform of this exemplary computing device, in idle state, may still consume about 8-10 W of power due to large portions of system resources, with longer latency (i.e., longer time necessary to wake up from a sleep state), being kept powered up to ensure better performance, while the processor may intermittently enter into appropriate sleep states during idle period.

BRIEF DESCRIPTION OF THE DRAWINGS

Embodiments of the disclosure will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments include, but are not limited to, methods and apparatuses for platform power management based on latency guidance.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in some embodiments" and "in various embodiments" are used repeatedly. These phrases generally do not refer to the same embodiment; however, they may. The terms "comprising," "having," and "including" are synonymous, unless the context dictates otherwise. The phrase "A and/or B" means "(A), (B), or (A and B)." The phrase "A/B" means "(A), (B), or (A and B)," similar to the phrase "A and/or B." The phrase "at least one of A, B and C" means "(A), (B), (C), (A and B), (A and C), (B and C) or (A, B and C)." The phrase "(A) B" means "(B) or (A B)," that is, A is optional.

Figure 2:
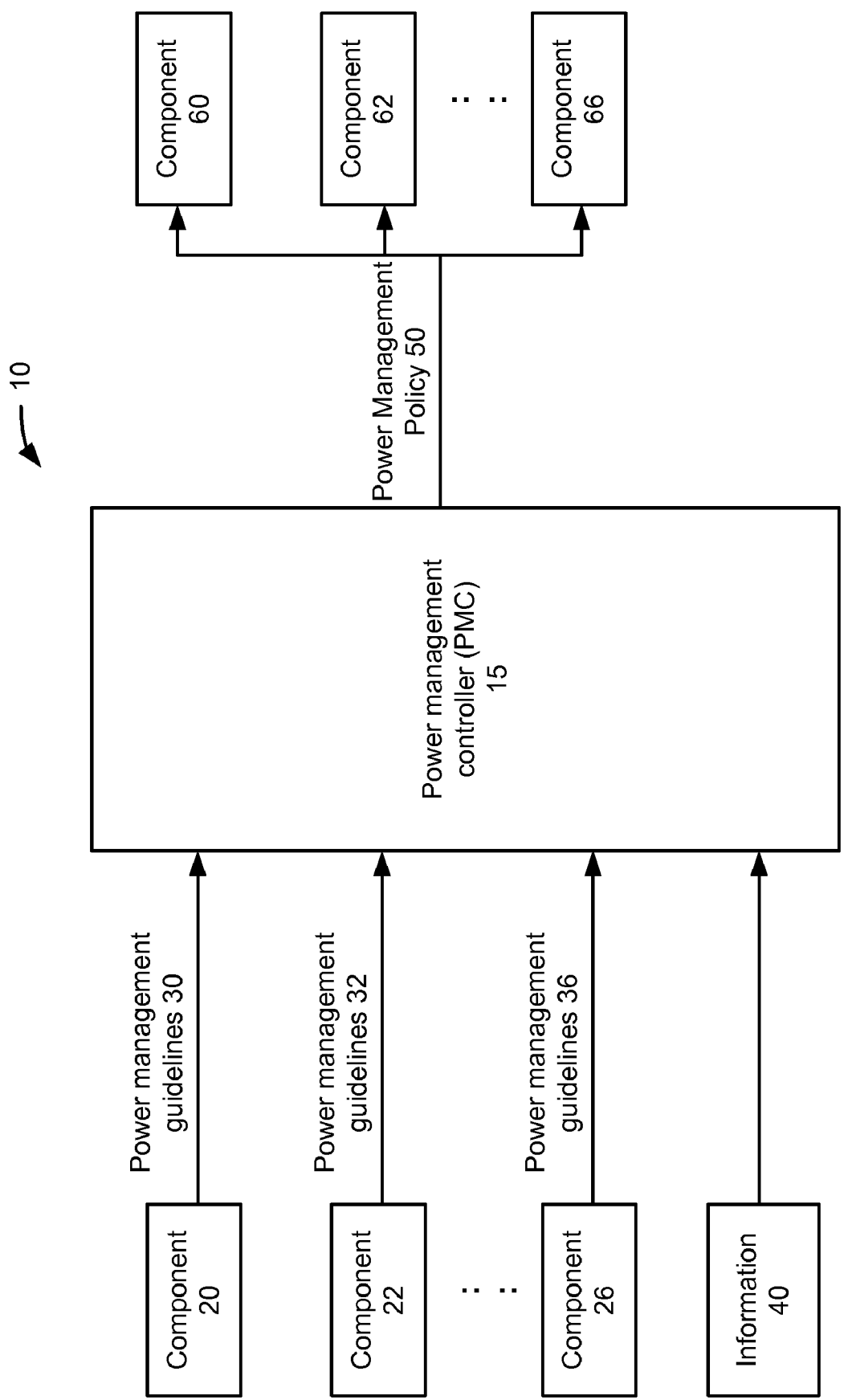
FIG. 2 is a block diagram of a power management system in accordance with various embodiments.

FIG. 2 is a block diagram of a power management system 10 in accordance with various embodiments. In various embodiments, the power management system 10 may be used in a computing device which may be, for example, a laptop, a cell phone, a personal computer, a personal digital assistant, a palmtop, a set-top box, or any other appropriate type of computing device. In various embodiments, the power management system 10 may be used in a mobile computing device.

The power management system 10 may include a power management controller (PMC) 15. The PMC 15 may be coupled to a first plurality of components 20, 22, 26 and may be configured to receive power management guidelines 30, 32, 36, from the components 20, 22, 26, respectively. In various embodiments, the PMC controller may also receive information 40, as would be discussed later. Responsive at least in part on the received power management guidelines 30, 32, 36, and/or information 40, the PMC 15 may be configured to generate a power management policy (PM policy) 50 for managing power of a second plurality of components and/or resources 60, 62, 66 associated with the computing device.

In various embodiments, the first plurality of components 20, 22, 26 may include one or more hardware/software components associated with the computing device. In various embodiments, the components 20, 22, 26 may include, for example, external devices coupled to the computing device, and/or devices/hardware internal to the computing device, including but not limited to a universal serial bus (USB) device (including devices compatible with various versions of the USB standard, e.g., USB 2.0, 3.0, etc.), a peripheral component interconnect (PCI) device, a PCI Express (PCIe) device, a network interface card, a peripheral device, a printer, a scanner, a disk drive, a camera, a network adapter, a serial advanced technology attachment (SATA), a parallel advanced technology attachment (PATA), etc. In various embodiments, the components 20, 22, 26 may also include one or more controllers configured to control one or more devices/functions in the computing device, including but not limited to, a USB host controller, a memory controller, an Ethernet controller, a graphics controller, a hard disk controller (HDD), an audio controller, Advanced Host Controller Interface (AHCI), etc. In various embodiments, the components 20, 22, 26 may also include one or more software applications running on the computing device, one or more device drivers, an operating system, etc.

In various embodiments, each of the components 20, 22, 26 may dynamically transmit power management guidelines 30, 32, 36, respectively, to the PMC 15. The power management guidelines may include one or more latency parameters of the respective component. For example, the power management guidelines may include a latency tolerance of the component. In various embodiments, the latency tolerance may be based at least in part on the maximum latency the component may tolerate without adversely affecting its performance. For example, the latency tolerance of a component 20 may be based at least in part on the maximum latency the component 20 can tolerate from generation of a processor break event (e.g., a hardware (HW) interrupt) while one or more components of the computing device are in a sleep mode and a first instruction associated with the component 20, upon entering into a normal/execution state (e.g., C0), getting executed. In various embodiments, the latency tolerance of a component may be based at least in part on the delay the component may tolerate without adversely affecting its performance, when the component and/or other components of the system transition from a sleep mode to a normal/execution state.

In various embodiments, the PM guidelines of a component may include one or more other elements, including but not limited to, a quality of service (QoS) parameter of the component, internal heuristics like interrupt frequency, input/output (I/O) traffic patterns, idle duration time (i.e., if the component knows the time to next scheduled timer interrupt), a workload expectation, and/or any other appropriate information about the component that may be useful to the PMC 15 for generating the PM policy 50. In various embodiments, one or more of the components 20, 22, 26 may also include a memory access latency of the component in its PM guidelines.

In various embodiments, for example, one of the components 20, 22, 26 may be an audio playing software application. The audio playing application may not tolerate any latency while actively playing an audio file. However, when idle, i.e., when not receiving/playing any audio file, the audio playing application may tolerate a larger latency, which may be based at least in part on the difference in the time the application starts receiving the audio file and the time the application has to start playing the audio file to avoid losing any data. To someone skilled in the art, it would be apparent that the latency tolerance of the application may be based party on its buffering capability. In various embodiments, the application may dynamically transmit its latency tolerance to the PMC 15 as a part of its power management guideline. Thus, while playing an audio file, the audio playing application may transmit a zero or a minimal latency tolerance to the PMC 15, whereas while in idle condition, the application may transmit a larger latency tolerance.

Figure 1:
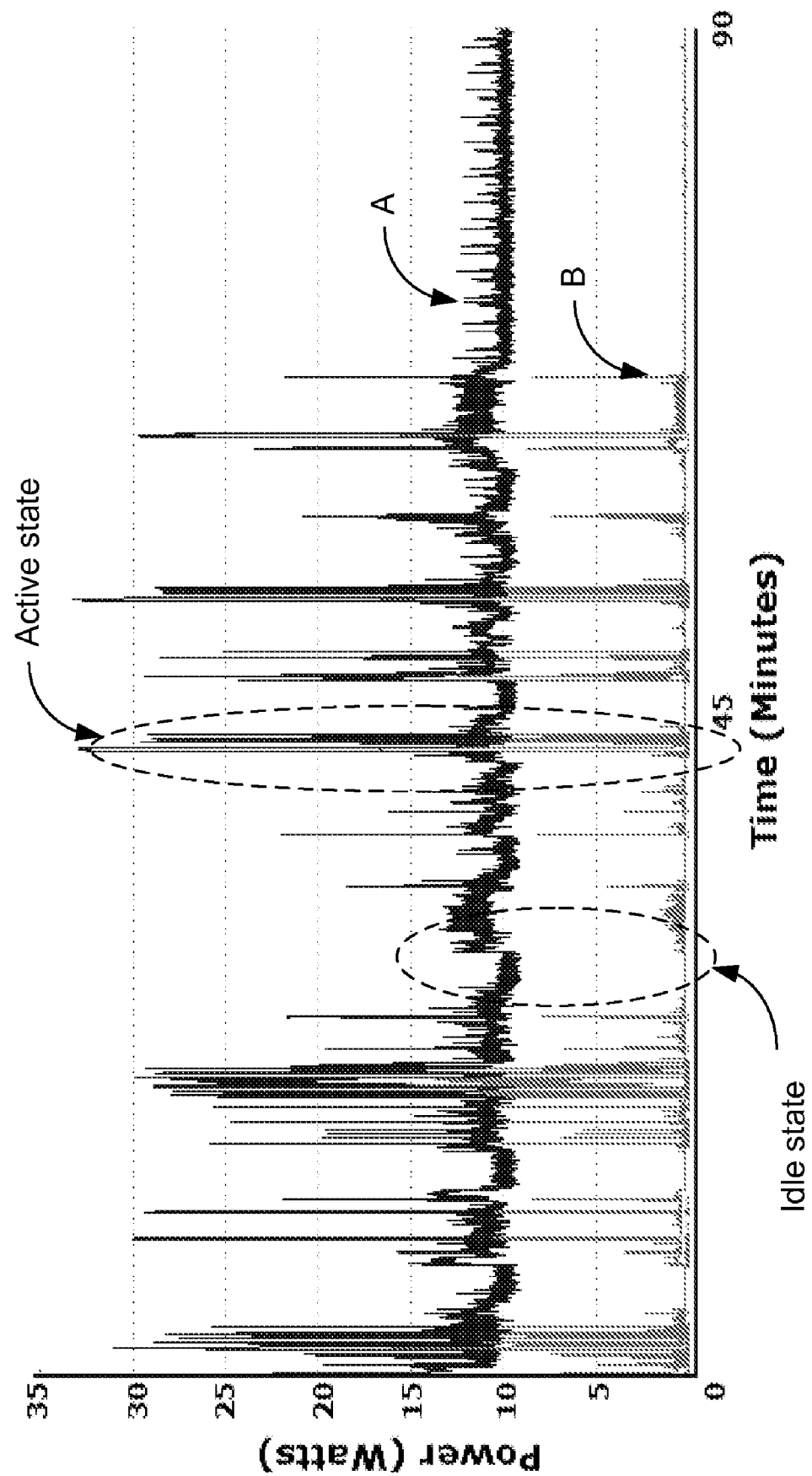
FIG. 1 is an exemplary graphical representation of a total power consumption of a platform of an exemplary computing system and the power consumption of its processor.
Figure 5:
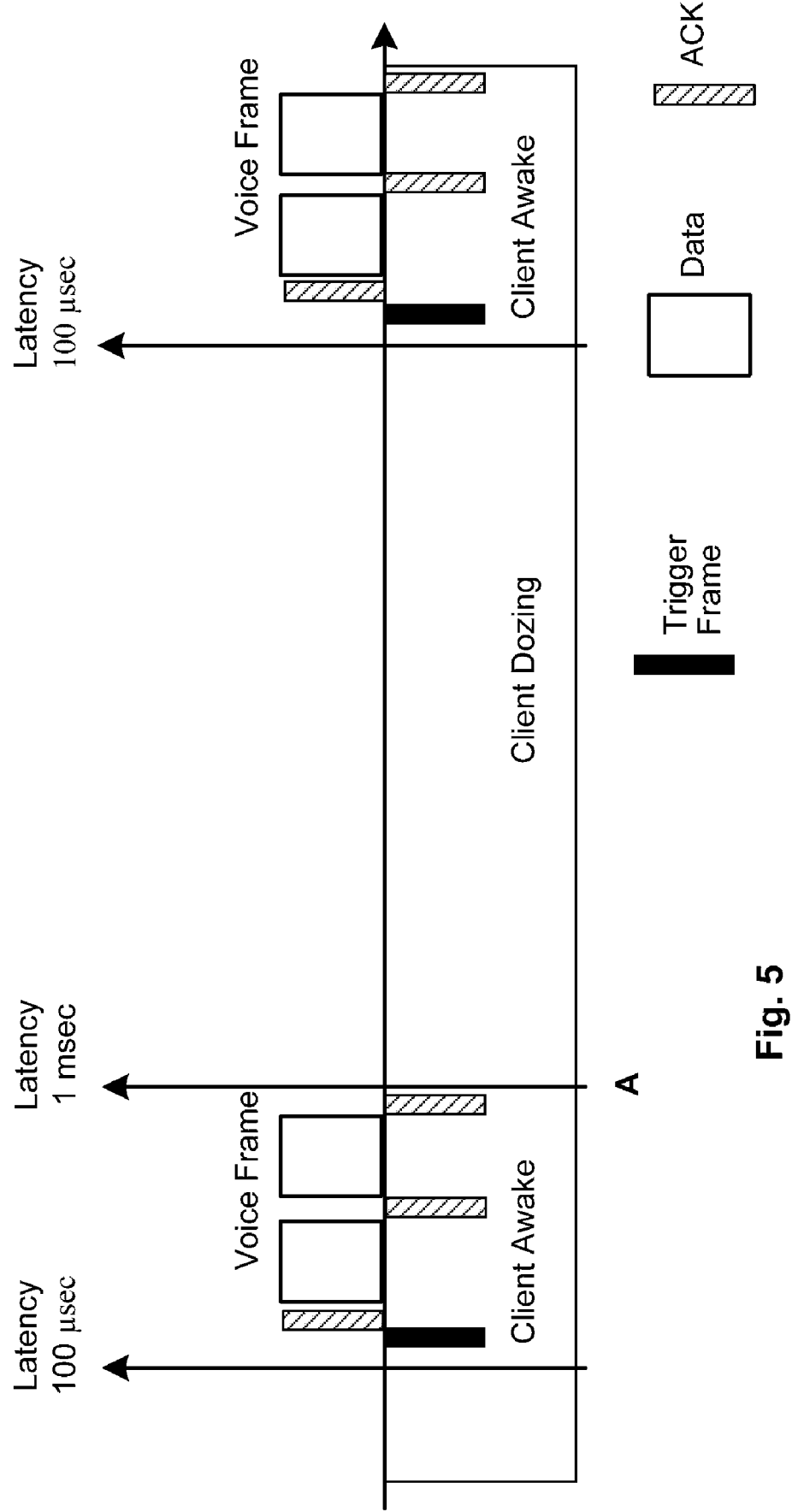
FIG. 5 illustrates an exemplary flow diagram of a latency tolerance reporting system of a Wi-Fi multimedia (WMM) power save mode in accordance with various embodiments.

In various embodiments, a component may doze in between activity periods. For example, a wide local area network (WLAN) client may enter a power save (doze) state whenever it is idle, as defined by the Institute of Electrical and Electronics Engineers (IEEE) 802.11 standards (e.g., 802.11e—2005 Amendments). The WLAN client may turn off its radio for durations defined by, for example, Wi-Fi Multimedia (WMM) power save mode of the IEEE 802.11e standard, during which an access point (AP) may buffer data for the client. These doze durations may be in the order of several milliseconds. A WLAN network interface card (NIC) may be aware of when to turn on the radio, wake up the WLAN client and/or start to communicate. FIG. 5 illustrates an exemplary block diagram of a latency tolerance reporting system of a WMM power save mode in accordance with various embodiments of the invention. As illustrated in FIG. 5, when the WLAN client is awake, it may tolerate a small latency, e.g., only 100 microsecond (μsec). However, while dozing, the client may tolerate a larger latency, e.g., about 1 millisecond (msec). In various embodiments, the NIC may accordingly transmit a latency tolerance of 100 μsec to the PMC 15 (FIG. 1) as a part of its PM guidelines during the client awake state. However, when the client is dozing, the NIC may transmit a latency tolerance of 1 msec to the PMC 15.

Referring to FIG. 2, in various embodiments, the PMC 15 may also receive information 40, which may also be used to generate the power management policy 50. For example, in various embodiments, the information 40 may include heuristics on traffic and activity patterns of the computing device and/or its components, including its processor. The information 40, in various embodiments, may include additional information known to those skilled in the art, e.g., information necessary to control power in a conventional ACPI-compatible system or other conventional power control systems. In various embodiments, an OS and/or a processor of the computing device may generate information 40.

Responsive at least in part on the received power management guidelines 30, 32, 36, and information 40, the PMC 15 may be configured to generate the PM policy 50 for managing power of the second plurality of components and/or resources 60, 62, 66 associated with the computing device. In various embodiments, the second plurality of components and/or resources 60, 62, 66 may include various core components and platform components of the computing device, e.g., a processor, a voltage regulator, a display panel, a clock generator, a phase-locked loop, etc. In various embodiments, the first plurality of components 20, 22, 26 and the second plurality of components and/or resources 60, 62, 66 may have one or more common components. For example, in various embodiments, the PMC 15 may receive PM guidelines from and generate PM policy 50 for an USB host controller.

In various embodiments, the PM policy 50 may specify one or more of the components 60, 62, 66 to enter in one of a plurality of sleep levels. For example, if all the components 20, 22, 26 have specified a latency tolerance of at least 1 msec in their respective PM guidelines, the PMC 15 may instruct one or more of the second plurality of components and/or resources 60, 62, 66 to enter into one of a plurality of sleep levels such that the one or more components take less than 1 msec to wake up from its respective sleep levels in response to an interruption, e.g., a processor break event, an HW interrupt, etc. Similarly, if the specified maximum latency tolerance of all the components 20, 22, 26 is at least, for example, 5 msec, the PM policy 50 may instruct one or more of the second plurality of components and/or resources 60, 62, 66 to enter into deeper sleep levels such that the components may take less than 5 msec to wake up. In various embodiments, the plurality of possible sleep levels may be similar to the C-states specified in the ACPI specification, and/or other sleep levels that may be envisioned by someone skilled in the art. That is, by being aware of the latency tolerance and other information in the PM guidelines of the components 20, 22, 26, the PM policy 50 may enable one or more of the components 60, 62, 66 to enter an appropriate sleep mode whenever the latency tolerances are high enough, thereby saving power, without adversely affecting the performance of the components 20, 22, 26.

In various embodiments, several other factors may also be taken into account while developing the PM policy 50. For example, if one of the components 20, 22, 26 specifies a high QoS parameter and a latency tolerance of, for example, 100 μsec in its PM guidelines, the PMC 15 may determine a sleep level for the components 60, 62, 66 such that the components may wake up much before 100 μsec, to satisfy the high QoS parameter.

In various embodiments, the PMC 15 may instruct less than all of the components 60, 62, 66 to enter in a sleep mode while instructing one or more other components to not enter in a sleep mode (or to enter in a different sleep mode). For example, if a voltage regulator and a clock generator are two of the components 60, 62, 66, and if the voltage regulator takes longer time to wake up as compared to the clock generator, the PMC 15 may instruct the voltage regulator to enter in a lighter level of sleep (or not to enter in a sleep level at all) as compared to a deeper sleep level for the clock generator for given latency tolerances received from components 20, 22, 26. However, if the received latency tolerances from components 20, 22, 26 are sufficiently high, then both the voltage regulator and the clock generator may enter a deeper level of sleep based on the PM policy 50.

In various embodiments, the deeper the sleep level, the more functionalities of a component may be disabled, the more is the power savings, and the more time it may take for the component to return to a normal execution state (i.e., to wake up).

In various embodiments, some of the second plurality of components and/or resources 60, 62, 66, e.g., some of the clock generators, voltage regulators, PLLs may only be switched on and off. That is, for some of these components, there may be only a single level of sleep (e.g., low power mode), which may be temporarily powering off these components in case the latency tolerances of the components 20, 22, 26 are sufficiently high. Accordingly, the PM policy 50 may also control the switching on and off of some/all of these components.

In various embodiments, components 20, 22, 26 may continuously transmit respective PM guidelines to the PMC 15. Alternatively, the components 20, 22, and 26 may transmit respective PM guidelines at regular intervals. Various alternate scenarios may also be possible, where some of the components continuously transmit, while the rest transmits periodically, at regular interval, respective PM guidelines. In various embodiments, a component may transmit its PM guidelines at the beginning, and re-transmit its PM guidelines only when there is a change in the PM guidelines.

Figure 3:
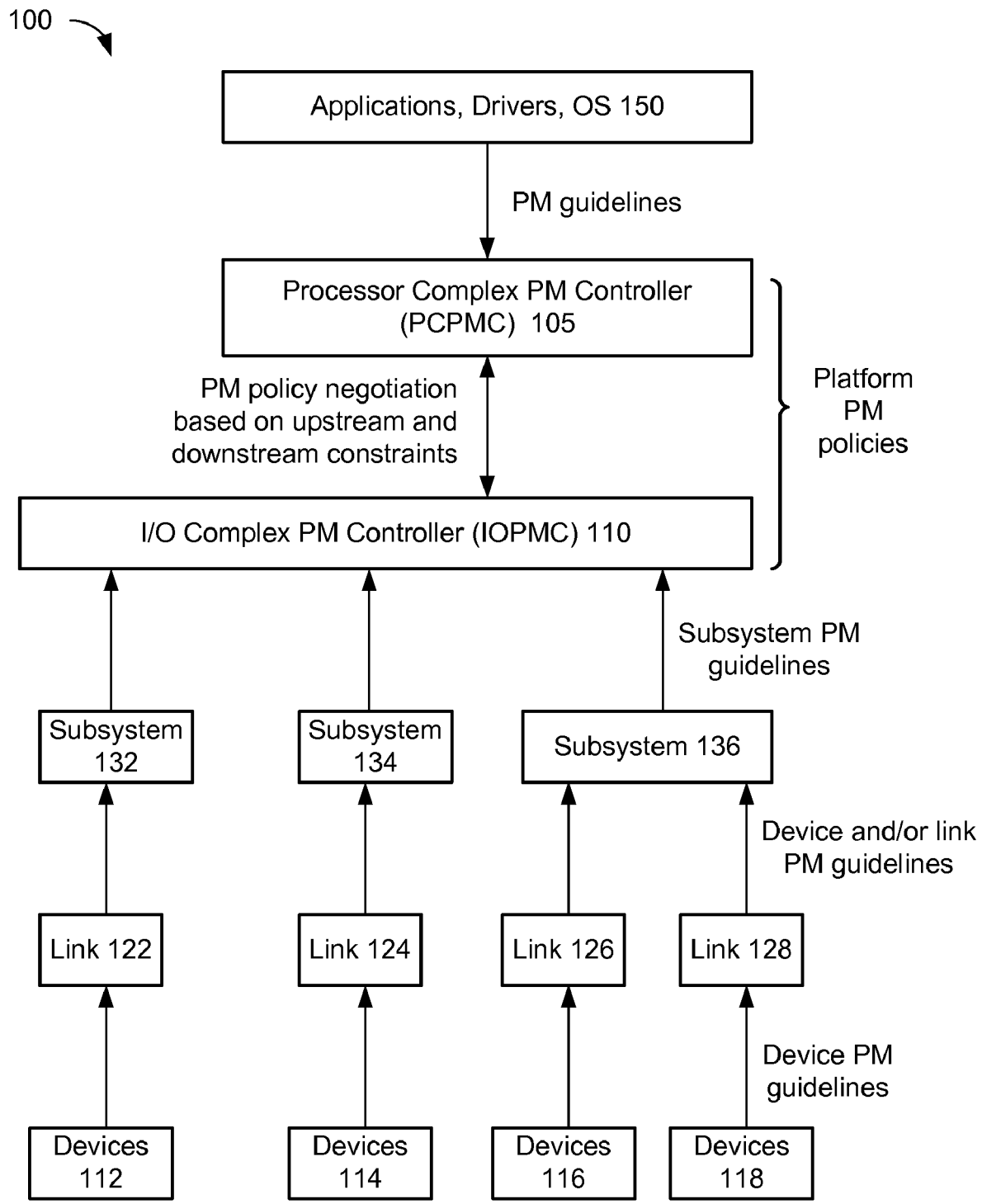
FIG. 3 is another block diagram of a power management system in accordance with various embodiments.

FIG. 3 is a block diagram of a power management system 100 in accordance with various embodiments of the invention. In various embodiments, the system 100 may include a processor complex power management controller (PCPMC) 105 coupled to an input/output (I/O) complex power management controller (IOPMC) 110. In various embodiments, the PCPMC 105 may be disposed in a central processing complex of a computing device, whereas the IOPMC 110 may be disposed in an I/O complex of the computing device.

As would be readily appreciated by those skilled in the art, although FIG. 3 illustrates only two power management controllers (PCPMC 105 and IOPMC 110), in various embodiments, there may be more than two power management controllers. For example, in a multi-processor environment, each processing complex may have an associated processor complex power management controller. In various embodiments, a single processing complex may include more than one processor complex power management controller. In various embodiments, power management controllers may also be disposed in various other areas of a computing device, although not illustrated in FIG. 3.

In various embodiments, the PCPMC 105 may receive PM guidelines from a plurality of software (SW) applications, device drivers, and/or operating system (OS) 150. As would be apparent to those skilled in the art, although illustrated as a single block, 150 may represent a plurality of components. In various embodiments, the SW/OS PM guidelines, including latency tolerances, may be conveyed to the PCPMC 105 via a register interface and/or via extensions to, for example, ACPI compatible C-state interface. The PM guidelines may include the maximum latency tolerance the OS perceives can be tolerated from generation of a processor break event (e.g., an HW interrupt) while in a sleep state and the first instruction, upon entering into a normal/execution state, getting executed.

Referring to FIG. 3, the IOPMC 110 may receive PM guidelines from a plurality of devices 112, 114, 116, 118, a plurality of links 122, 124, 126, 128, and/or a plurality of subsystems 132, 134, and 136. The links and/or the subsystems may be used to couple one or more devices to the computing device. For example, the device 112 may be a USB device, and the corresponding subsystem 132 may be a USB controller, and the link 122 may be a USB link, and each may have its own latency constraints. In various embodiments, multiple devices (e.g., 116 and 118) may be coupled to a single subsystem. In various embodiments, the subsystems 132, 134, and/or 136 may include, but not limited to a USB host controller, a memory controller, an Ethernet controller, or a graphics controller. In various embodiments, each of the devices 112, . . . , 118 may transmit a power management guidelines to its respective links. In various embodiments, one or more of the links 122, ..., 128 may augment the device power management guidelines with a link power management guidelines and transmit to one of the subsystems 132, 134, 136.

The subsystems 132, 134, 136 may take into account the PM guidelines received from respective links and/or devices to generate a subsystem PM guidelines and transmit it to the IOPMC 110. For example, if a USB device 112 and an associated USB controller (subsystem 132) have a latency tolerance of 1 msec and 800 μsec, respectively, the USB controller may include the lower of the two latency tolerance, i.e., 800 μsec, in the subsystem PM guidelines, and transmit it to the IOPMC 110.

In various embodiments, if devices 116, 118, links 126, 128, and/or subsystem 136 have different PM guidelines (including different latency tolerances), the subsystem 136 may simply re-transmit each of the received PM guidelines (along with its own PM guidelines) to the IOPMC 110. Alternatively, in various embodiments, the subsystem 136 may take into account all the received PM guidelines and develop a unified subsystem PM guidelines. For example, the subsystem 136 may transmit the minimum of the latency tolerances of the devices 116, 118, links 126, 128, and/or subsystem 136 to the IOPMC 110.

The devices 112, ..., 118, links 122, ..., 128, the subsystems 132, ..., 136, and/or the applications, device drivers, OS 150 may include additional information in the transmitted PM guidelines. For example, in various embodiments, the PM guidelines may include but not limited to, a QoS parameter, internal heuristics like interrupt frequency, I/O traffic patterns, idle duration time (i.e., if a device/subsystem knows the time to next scheduled timer interrupt), a workload expectation, and/or other appropriate information that may be useful to the power management controllers. In various embodiments, one or more of the devices/subsystems may also include respective memory access latency in their PM guidelines. In various embodiments, the PM controllers may take into account the memory access latency, along with the latency tolerance, to generate appropriate PM policies. In various embodiments, the latency tolerance may be based at least in part on the associated memory access latency.

Once the PCPMC 105 and the IOPMC 110 receive power management guidelines from the applications, device drivers, OS, devices, links, and/or subsystems, the PCPMC 105 and the IOPMC 110 may exchange the guidelines, negotiate, and/or jointly formulate a dynamic power management policy for a plurality of components (not shown in FIG. 3) associated with the computing device, e.g., various core components and platform components of the computing device, including but not limited to, a processor, a voltage regulator, a display panel, a clock generator, and/or a phase-locked loop. In various embodiments, the developed power management policy may be similar to the PM policy 50 of FIG. 2.

In various embodiments, the IOPMC 110 and the PCPMC 105 may take into account other factors while developing the PM policy. For example, if the computing device includes a direct media interface (DMI), the latency of the DMI may also be taken into account while developing the PM policy.

In various embodiments, the applications, drivers, and/or OS 150, devices 112, ..., 118, links 122, ..., 128, and/or the subsystems 132, ..., 136 may include a performance advice in their respective PM guidelines, wherein the performance advice may include the current performance level and predicted future performance levels, if available, of these components. The power management controllers may, in various embodiments, compute a latency tolerance of these components from the received performance advice. Alternatively, the transmitted performance advice may include the latency tolerance.

While the devices 112, ..., 118 and subsystems 132, ..., 136 of FIG. 3 are shown to be coupled to the IOPMC 110, in various embodiments, some of the devices and subsystems may be coupled to the PCPMC 105, instead of (or optionally, in addition to) IOPMC 110. For example, an external bus and/or a graphics card on a PCIe graphics (PEG) port may be coupled to the PCPMC 105 and provide respective PM guidelines to the PCPMC 105.

Figure 4:
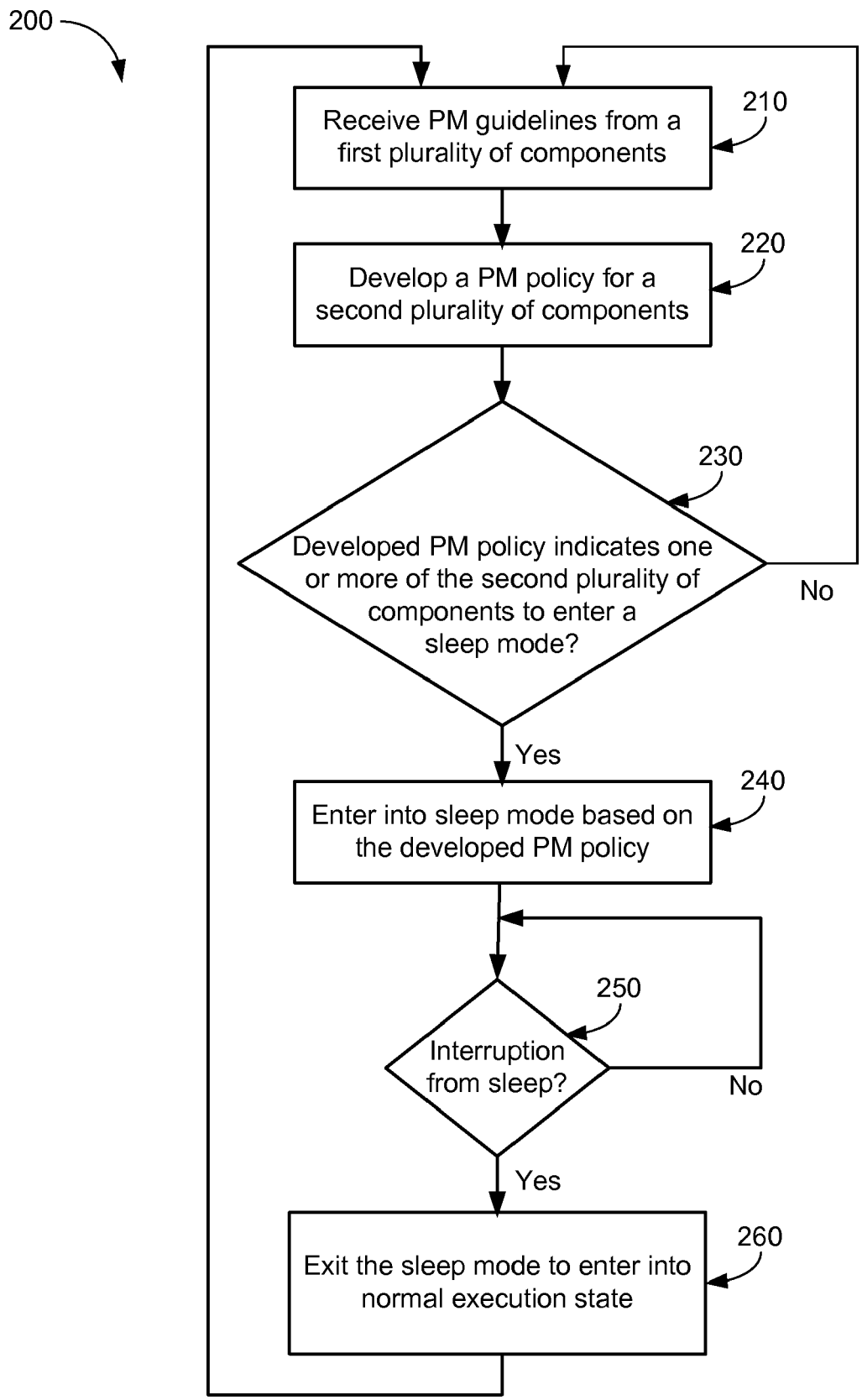
FIG. 4 is a flow diagram of a power management method in accordance with various embodiments.

FIG. 4 is a flow diagram of a power management method 200 suitable for the power management systems of FIGS. 2 and 3, in accordance with various embodiments. Referring to FIGS. 2 and 3, at 210, the PCPMC 105 and the IOPMC 110 may receive power management guidelines from a first plurality of components, including one or more of the applications, device drivers, and OS 150, devices 112, ..., 118, links 122, ..., 128, and/or subsystems 132, ..., 136. At 220, the PCPMC 105 and the IOPMC 110 may jointly develop a PM policy for a second plurality of devices, including one or more core components and platform components of the computing device, for example, a processor, a voltage regulator, a display panel, a clock generator, and/or a phase-locked loop. In various embodiments, one or more of the first plurality of the components may also be included in the second plurality of components.

At 230, it is decided, based at least in part on the developed PM policy, if one or more of the second plurality of components and/or resources is to enter a sleep mode (e.g., low power mode). If none of the components enters a sleep mode, the PCPMC 105 and the IOPMC 110 may continue to receive power management guidelines from the first plurality of components at 210.

If the developed PM policy, at 230, does indicate one or more of the second plurality of components and/or resources to enter a sleep mode, the indicated components may enter into appropriate sleep modes, at 240, based at least in part on the developed PM policy. The components may remain in the sleep mode unless there is an interruption, e.g., a processor break event, an HW interrupt, or any other appropriate interruption well known to those skilled in the art. Upon detecting such an interruption at 250, the components may exit from sleep to enter into a normal execution state at 260, and the PCPMC 105 and the IOPMC 110 may continue to receive the power management guidelines from the first plurality of components at 210.

Figure 6:
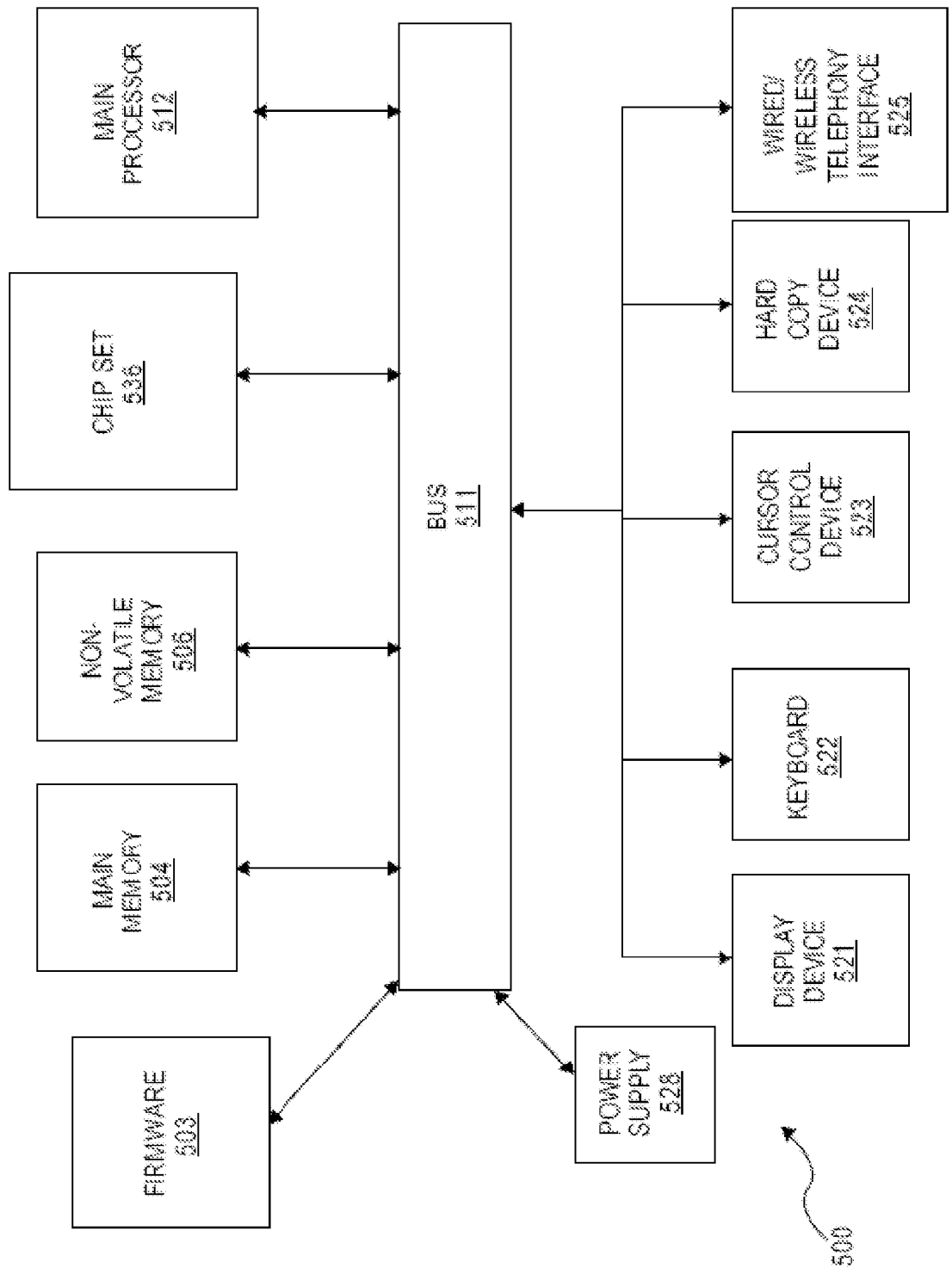
FIG. 6 illustrates a block diagram of an example computer system that may be suitable for practicing some embodiments.

FIG. 6 illustrates a block diagram of an example computer system 500 that may be suitable for practicing some of the embodiments, including the systems of receiving power management guidelines, and developing power management policies based at least in part on the received power management guidelines. In some embodiments, the computer system 500 may include a communication mechanism or bus 511 for communicating information, and an integrated circuit component such as a processor 512 coupled with bus 511 for processing information.

Computer system 500 further comprises a random access memory (RAM) or other dynamic storage device 504 (referred to as main memory) coupled to bus 511 for storing information and instructions to be executed by processor 512. Main memory 504 also may be used for storing temporary variables or other intermediate information during execution of instructions by processor 512.

Firmware 503 may be a combination of software and hardware, such as Electronically Programmable Read-Only Memory (EPROM) that has the operations for the routine recorded on the EPROM. The firmware 503 may embed foundation code, basic input/output system code (BIOS), or other similar code. The firmware 503 may make it possible for the computer system 500 to boot itself.

Computer system 500 also comprises a read-only memory (ROM) and/or other static storage device 506 coupled to bus 511 for storing static information and instructions for processor 512. The static storage device 506 may store OS level and application level software.

Computer system 500 may further be coupled to a display device 521, such as a cathode ray tube (CRT) or liquid crystal display (LCD), coupled to bus 511 for displaying information to a computer user. A chipset, such as chipset 536, may interface with the display device 521.

An alphanumeric input device (keyboard) 522, including alphanumeric and other keys, may also be coupled to bus 511 for communicating information and command selections to processor 512. An additional user input device is cursor control device 523, such as a mouse, trackball, trackpad, stylus, or cursor direction keys, coupled to bus 511 for communicating direction information and command selections to processor 512, and for controlling cursor movement on a display device 521. A chipset, such as chip set 536, may interface with the input output devices.

Another device that may be coupled to bus 511 is a hard copy device 524, which may be used for printing instructions, data, or other information on a medium such as paper, film, or similar types of media. Furthermore, a sound recording and playback device, such as a speaker and/or microphone (not shown) may optionally be coupled to bus 511 for audio interfacing with computer system 500. Another device that may be coupled to bus 511 is a wired/wireless communication capability 525.

Computer system 500 has a power supply 528 such as a battery, AC power plug connection and rectifier, etc., as one of ordinary skill in the relevant art would appreciate based at least on the teachings provided herein.

In various embodiments, a power management controller (not shown in FIG. 6), similar to the PMC 15 of FIG. 2 and/or the PCPMC 105/IOPMC 110 of FIG. 3, may be included in the computer system 500 of FIG. 6. In various embodiments, the power management controller may be coupled to the bus 511 and may receive power management guidelines from a plurality of components of the computer system 500, e.g., one or more applications configured to be executed by the processor 512, an OS of the computer system 500, one or more device drivers of the computer system 500, firmware 503, chipset 536, one or more controllers (e.g., a USB host controller, a memory controller, an Ethernet controller, a graphics controller, etc., not shown in the figure) of the computer system 500, one or more devices coupled to the computer system 500 including, but not limited to, display device 521, keyboard 522, cursor control device 523, hard copy device 524, communication interface 525, etc. In various embodiments, the power management controller may develop power management guidelines for a plurality of components of the computer system 500, for example, one or more platform components of the computer system 500, processor 512, chipset 536, one or more voltage regulators and clock generators included in the computer system 500, a phase-locked loop, a display panel (e.g., the display device 521), etc. In various embodiments, the processor 512 may be configured to execute a plurality of tasks to provide an operating system service, a device driver service, and/or one or more application functions. In various embodiments, the power management controller may receive power management guidelines and performance advices, as previously discussed, from one or more of the tasks executed by the processor 512.

In various embodiments, the processor 512 and the power management controller may be co-disposed on an integrated circuit. If the power management controller includes a PCPMC and an IOPMC (similar to FIG. 3), in various embodiments, the processor 512 and the PCPMC may be co-disposed on an integrated chip, and in various embodiments, the IOPMC may be disposed in an I/O complex (not shown in figure) of the computer system 500. In various embodiments, the processor 512 may be configured to operate as one or more of the power management controllers previously discussed. In various embodiments, the computer system 500, including the processor 512, various hardware components, and/or the power management controller, may have dimension or shape configured to facilitate the computer system 500 to be employed for mobile computing. In various embodiments, the computer system 500 may be used as a mobile phone, a laptop, a personal digital assistant, a palmtop, a MP3 player, a personal computer, a set-top box, or any other appropriate type of computing device. In various embodiments, the computer system 500 may be used as a mobile computing device. In various embodiments, the processor 512 and various components of the computer system 500 may be housed in a body having dimension or shape configured to facilitate the computer system to be employed for mobile computing.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the invention. This application is intended to cover any adaptations or variations of the embodiments discussed herein. Therefore, it is manifestly intended that the embodiments of the invention be limited only by the claims and the equivalents thereof.

The invention claimed is:

1. A method comprising:
receiving, by a power management controller of a platform, power management guidelines from a first plurality of components associated with a system hosting the platform, wherein said receiving comprises receiving, by the power management controller, from one or more of the first plurality of components, maximum latency tolerances of the one or more of the first plurality of components; and
developing, by the power management controller, a power management policy to manage one or more of a second plurality of components of the system based at least in part on the received power management guidelines;
wherein said developing comprises:
determining a minimum of the maximum latency tolerances of the one or more of the first plurality of components; and
determining one or more first sleep levels for a first one of the second plurality of components and one or more second sleep levels, different than the first sleep levels, for a second one of the second plurality of components, such that time taken for the first and seconds ones of the second plurality of components to wake up from the determined first and second sleep levels of the second plurality of components is less than the minimum of the maximum latency tolerances of the one or more of the first plurality of components.

2. The method of claim 1, wherein said receiving comprises receiving, by the power management controller, a workload expectation and/or a quality of service parameter of at least one of the first plurality of components.

3. The method of claim 1, wherein said developing comprises developing, by the power management controller, the power management policy based further at least in part on heuristics collected on traffic and/or activity patterns of the system.

4. The method of claim 1, wherein said developing comprises developing, by the power management controller, the power management policy for a component selected from the group consisting of a processor, a voltage regulator, a display panel, a clock generator, and a phase-locked loop.

5. The method of claim 1, wherein said receiving comprises receiving, by the power management controller, power management guidelines from a component selected from the group consisting of a software application, a device driver, an external device coupled to the system, a link coupling the external device to the system, a controller, and an operating system.

6. The method of claim 1, wherein said developing comprises developing, by the power management controller, a power management policy that includes temporarily powering off one or more of the second plurality of components.

7. An apparatus comprising:
a power management controller configured to:
receive from a first plurality of components, latency parameters of one or more of the first plurality of components, wherein latency parameters of the one or more of the first plurality of components includes maximum latency tolerances of the one or more of the first plurality of components;
determine a minimum of the maximum latency tolerances of the one or more of the first plurality of components; and
determine a power management policy to manage power consumption of individual ones of a second plurality of components, based at least in part on the minimum of the maximum latency tolerances;
wherein the power management controller comprises:
a processor power management controller configured to be disposed in a central processing complex of a platform and to receive the latency parameter of a first component of the first plurality of components; and an input/output (I/O) power management controller configured to be disposed in
an I/O processing complex of the platform and to receive the latency parameter of a second component of the first plurality of components; and
wherein the processor power management controller and the I/O power management controller are further configured to exchange the received latency parameters and jointly determine the power management policy for the second plurality of components.

8. The apparatus of claim 7, wherein a component of the second plurality of components is selected from the group consisting of a processor, a voltage regulator, a display panel, a clock generator, and a phase-locked loop.

9. The apparatus of claim 7,
wherein the power management controller is further configured to determine the power management policy by determining a plurality of sleep levels for one or more of the second plurality of components, such that time taken for the one or more of the second plurality of components to wake up from the determined sleep level of the component is less than the minimum of the maximum latency tolerances.

10. The apparatus of claim 7, wherein the first component is selected from the group consisting of a software application, a device driver, and an operating system, and wherein the second component is selected from the group consisting of an external device coupled to the apparatus, a subsystem in the apparatus to which the device is coupled, and a controller to control a function of the apparatus.

11. The apparatus of claim 7, wherein the I/O power management controller is configured to receive, from a USB host controller, the latency parameter of the USB host controller, and wherein the latency parameters of the USB host controller includes latency parameter of one or more USB devices coupled to the USB host controller.

12. The apparatus of claim 7, wherein the apparatus is a platform configured to be disposed in a computing device configured for mobile computing.

13. A computing device comprising:
a processor configured to execute a plurality of tasks;
a plurality of hardware components coupled to the processor;
a power management controller coupled to the processor and the hardware components, and configured to manage power usage of one or more of the hardware components, in view of performance advices provided by one or more of the tasks, wherein said performance advices include latency tolerances of the one or more of the tasks; and
a body to house the processor, the hardware components, and the power management controller, the body having dimension or shape configured to facilitate the computing device to be employed for mobile computing;
wherein said performance advice provided by the one or more of the tasks includes maximum latency tolerances of the one or more of the tasks; and
wherein the power management controller is configured to manage power usage of the one or more individual ones of the hardware components based on a minimum of the maximum latency tolerances of the one or more of the tasks.

14. The computing device of claim 13, wherein one or more of the said tasks is configured to provide a selected one of an operating system service, a device driver service, or an application function.

15. The computing device of claim 13, wherein one or more of the plurality of hardware components is selected from the group consisting of a voltage regulator, a display panel, a clock generator, and a phase-locked loop.

16. The computing device of claim 13, wherein the processor and power management controller are co-disposed on an integrated circuit.

17. The computing device of claim 13, wherein the power management controller is configured to manage power usage of the one or more of the hardware components, further in view of performance advices provided by one or more hardware components coupled to the processor.

18. An article comprising:
a non-transitory computer-readable storage medium; and
instructions stored in the storage medium, and configured to program a processor to enable the processor to:
receive power management guidelines from a first plurality of components coupled to the processor, wherein said receiving comprises receiving from one or more of the first plurality of components, latency tolerances of the one or more of the first plurality of components, wherein a latency tolerance of a first component of the one or more of the first plurality of components is based on a buffering capability of the first component; and develop a power management policy to manage one or more individual ones of a second plurality of components coupled to the processor based at least in part on the received power management guidelines;

wherein the processor is enabled to develop the power management policy by determining a plurality of sleep levels for the second plurality of components, such that time taken for one or more of the second plurality of components to wake up from the determined sleep level of the component is less than latency tolerances of one or more of the first plurality of components.

19. The article of claim 18, wherein the processor is enabled to develop the power management policy by determining a sleep level for one of the second plurality of components.

20. The method of claim 1, wherein a maximum latency tolerance of a first component of the one or more of the first plurality of components is a maximum latency the first component can tolerate without adversely affecting a performance of the first component.

21. The method of claim 1, wherein a maximum latency tolerance of a first component of the one or more of the first plurality of components is based on a buffering capability of the first component.

22. The method of claim 1, wherein said developing further comprises instructing the first one of the second plurality of components to enter one of the first sleep levels, instructing the second one of the second plurality of components to enter one of the second sleep levels, and instructing a third one of the second plurality of components to not enter a sleep mode.

* * * * *